Sept. 15, 1931.  H. C. HIRSCHY  1,823,271

WASHING MACHINE TRANSMISSION

Original Filed Aug. 21, 1925    2 Sheets-Sheet 1

Inventor
HERMAN C. HIRSCHY
By Paul, Paul & Moore
ATTORNEYS

Sept. 15, 1931.   H. C. HIRSCHY   1,823,271
WASHING MACHINE TRANSMISSION
Original Filed Aug. 21, 1925   2 Sheets-Sheet 2
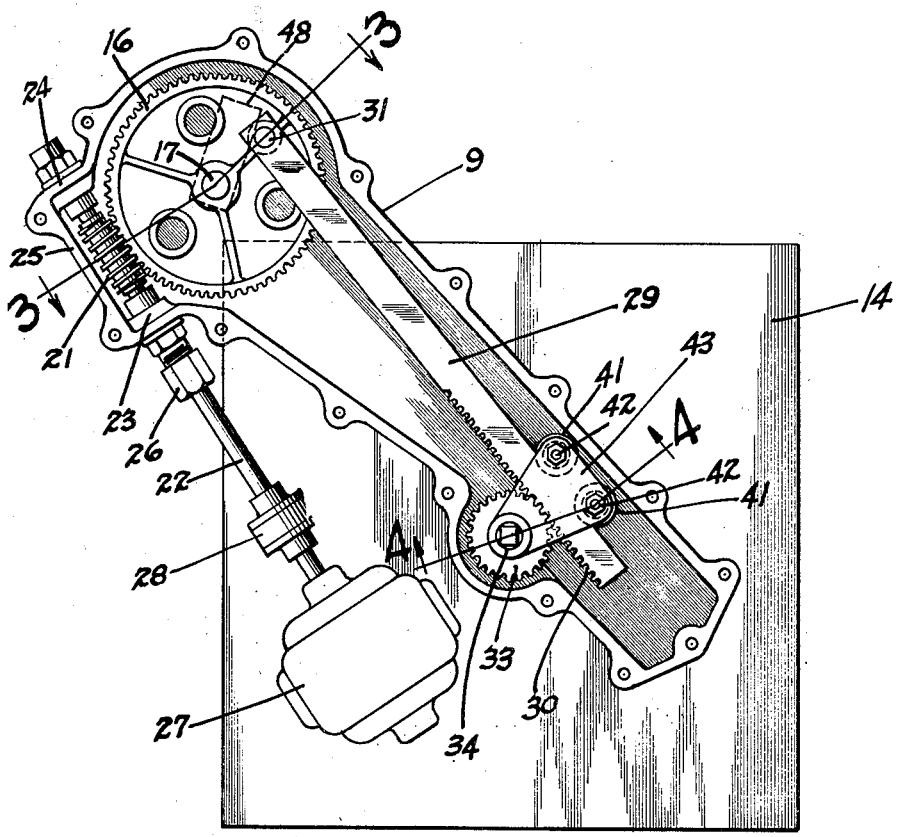
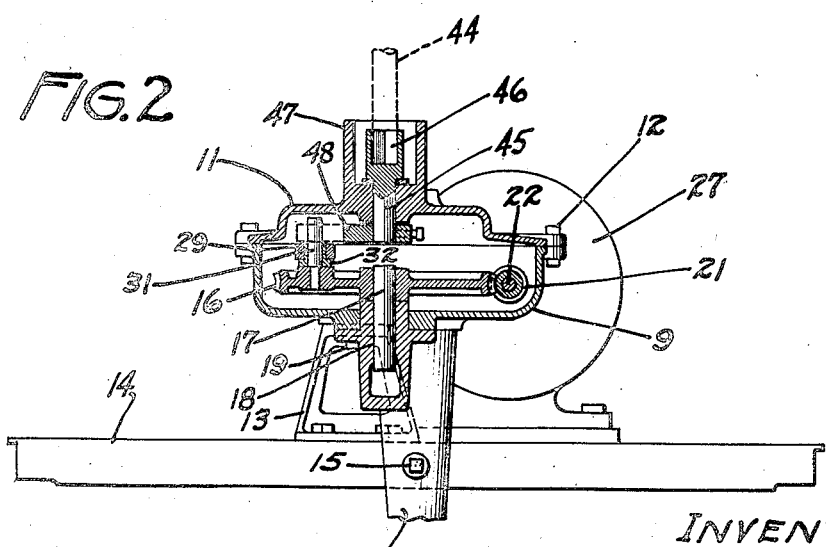
INVENTOR
HERMAN C. HIRSCHY
ATTORNEYS Patented Sept. 15, 1931

1,823,271

UNITED STATES PATENT OFFICE

HERMAN C. HIRSCHY, OF DULUTH, MINNESOTA, ASSIGNOR TO THE HIRSCHY COMPANY, OF DULUTH, MINNESOTA, A CORPORATION OF MINNESOTA

WASHING MACHINE TRANSMISSION

Application filed August 21, 1925, Serial No. 51,612. Renewed January 14, 1929.

The invention relates to improvements in washing machine transmissions in general and more particularly to the operating mechanism of such machines of the dolly type, or those employing an oscillatory shaft to which the washing member is connected.

An object of the invention is to provide an operating mechanism or transmission for a washing machine which is so constructed that all of the strains generated therein in the operation of the machine will be taken up entirely by the transmission housing, thereby eliminating such strains from the working parts of the machine.

A further object of the invention is to provide a washing machine transmission which is self-contained and is mounted in an oil-tight case and which also is provided with a loose coupling between the oscillating shaft of the machine and the transmission and also having a loose connection with the wringer drive shaft, thereby substantially eliminating all torque or strains from the machine frame.

A further object is to provide a transmission mounted upon a supporting plate carried by the machine frame and upon which supporting plate a motor may also be mounted for operating the transmission to drive the machine.

A particular object of the invention, therefore, is to provide a washing machine transmission of simple and inexpensive construction, and which may be mounted upon the machine frame as a unit in such a manner as to eliminate from the machine frame all strains caused by the driving operation of the transmission.

Other objects of the invention will appear from the following description and the accompanying drawings and will be pointed out in the annexed claims.

In the accompanying drawings there has been disclosed a structure designed to carry out the various objects of the invention, but it is to be understood that the invention is not confined to the exact features shown as various changes may be made within the scope of the claims which follow.

Another feature of the invention resides in the use of a leg which lies substantially beneath and in vertical alignment with the wringer shaft 8, and which may be considered an extension of the casing which encloses the shaft. By inspection of Figures 1 and 2, it will be seen that when the wringer 7 is swung outwardly there is a tendency of the apparatus to tip. When the wringer 7 is brought to a position wherein the rollers are disposed substantially diametrically with respect to the casing 9 and radial with respect to the tub axis, it will be seen that the weight of the wringer is counter-balanced by all of the weight of the remainder of the device which lies at that side of the shaft 8 or leg opposite the wringer. This counter-balancing arrangement is a valuable feature of the invention. This counter-balancing arrangement is a valuable feature irrespective of the question of whether the gear casing is attached to the leg or supported by it or not, so long as the leg is placed in a manner to be substantially at the center of gravity of the system under the conditions above mentioned. Another feature relates to the partial support of the casing by means of the leg, so that the gear 16, (when the casing 9 is thus supported) is arranged in proper relation to the wringer shaft 8.

It will be evident that the arrangement of the shaft substantially in alignment with one of the legs as disclosed in the drawings, as a means for obtaining counter-balanced relation of the wringer and tub, is a valuable feature, since heretofore all wringers of this type have been tippable or have had a greater tendency to tip, when the wringer has swung outwardly, particularly inasmuch as the wringer is at the top of the system, or well above the vertical center of gravity thereof.

In the accompanying drawings forming part of this specification,

Figure 2 is a plan view of the transmission with the cover removed to show the operating mechanism therein;

Figure 3 is a detail sectional view on the line 3—3 of Figure 2; and

In the selected embodiment of the invention here shown, for purposes of disclosure, there is illustrated a washing machine of ordinary construction, comprising a tub 5 supported upon the usual legs 6. A wringer 7 is also shown adjustably mounted upon an upright supporting post 8 having a driving connection with the transmission as will hereinafter be described.

Figure 4:
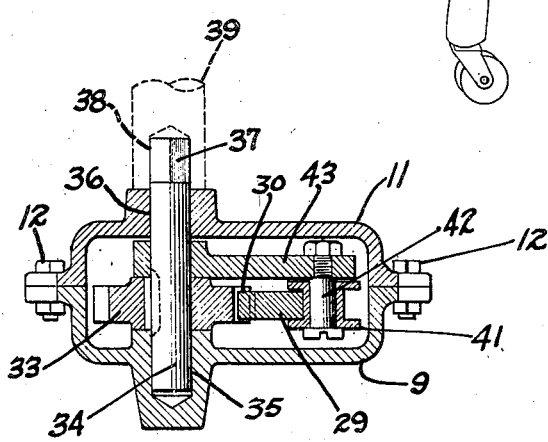
Figure 4 is a similar view on the line 4—4 of Figure 2.

The novel transmission featured in this invention preferably comprises a casing 9 having a cover 11 adapted to be secured thereto by means of bolts 12 so as to provide an oil-tight casing in which the operating mechanism is mounted, as clearly shown in Figures 2, 3 and 4. One end of the casing 9 is supported upon a bracket 13 suitably secured to a supporting plate 14 which is mounted upon and secured to the legs 6 by such means as the bolts 15 (see Figure 1). The opposite end of the transmission case 9 is supported by one of the machine legs as shown particularly in Figure 3.

The operating mechanism of the transmission preferably consists of a worm wheel 16 secured to a stud 17 rotatably mounted in a bearing 18 preferably demountably secured to the bottom wall of the casing 9 by means of bolts or cap screws 19 as shown in Figure 3. A worm 21 is secured to a shaft 22 which is rotatably mounted in bearings 23 and 24 provided in the offset portion 25 of the casing as shown in Figure 2. A packing nut 26 is mounted on the shaft 22 to prevent oil leakage from the transmission casing through the bearing 23 when the transmission is in operation. The drive shaft 22 is operatively connected to a motor 27, of ordinary construction, by means of a flexible coupling 28. The motor 27 is also preferably mounted upon and secured to the supporting plate 14 so that the motor and transmission case may be assembled as a unit.

The transmission featured in this invention is particularly adapted for use with machines employing an oscillating shaft such as the dolly type of washing machines. Means are, therefore, provided for loosely and operatively connecting the transmission with the oscillatory shaft of the washing machine, so that when the transmission is operated the power required to oscillate the washing machine shaft will not exert any strain upon the machine frame, as the transmission is so constructed as to take up and absorb all such strains without transmitting them to the machine frame.

The means for operating the washing machine shaft consists of a rack bar 29 having one end pivotally connected to a crank pin 31 secured to the worm wheel 16 as shown in Figure 3. A flanged bushing 32 is preferably mounted in the rack bar 29 to provide a bearing for the crank pin 31. The other end of the rack bar 29 is provided with a plurality of teeth 30 adapted to mesh with a pinion 33 secured to a short shaft 34 mounted in bearings 35 and 36 provided in the casing 9 and cover 11, respectively (see Figure 4). The shaft 34 is preferably provided at its upper end with a squared end-portion 37 adapted to be loosely received in a similarly shaped socket 38 provided in the lower end of the washing machine shaft 39, as shown in full lines in Figure 1 and dotted lines in Figure 4. The rack bar is supported by means of flanged wheels 41 mounted upon posts 42 secured to a bracket 43 which is pivotally mounted upon the shaft 34 as shown. The arrangement of the flanged wheels 41 upon the bracket 43 is such as to provide a vertical support for the rack bar 29 and also to retain it in mesh with the pinion 33.

Figure 1:
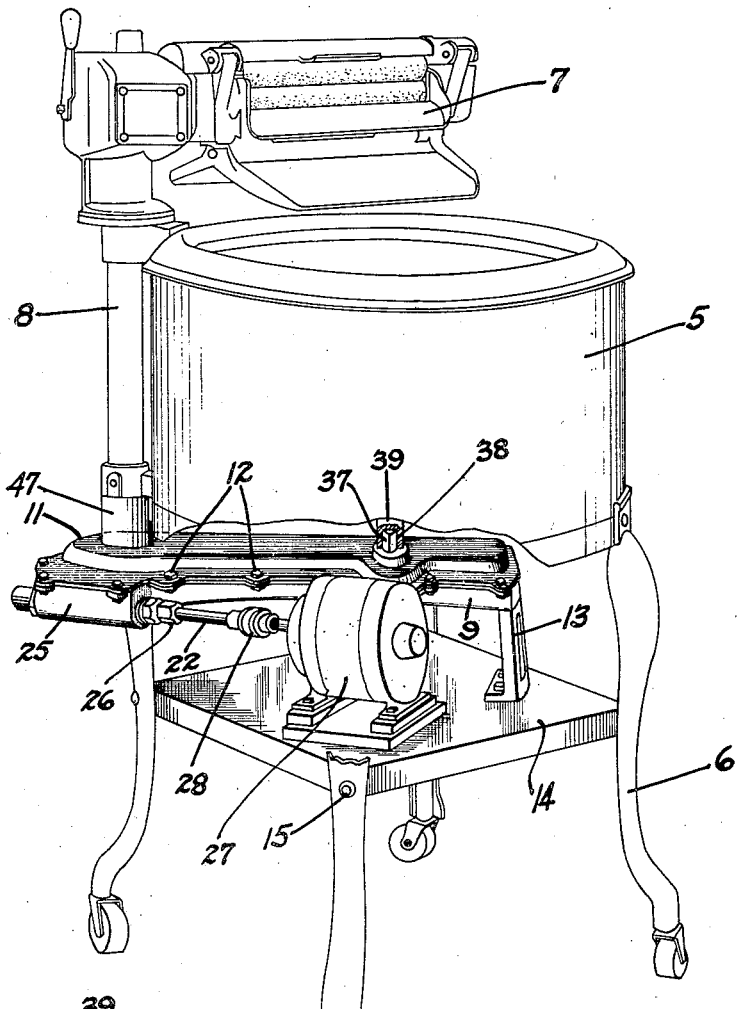
Figure 1 is a view in perspective of a washing machine showing my invention applied thereto.

The wringer drive shaft 44, indicated in dotted lines in Figure 3, is similarly connected to the transmission. A stud or short shaft 45, having a socket 46, preferably square, is rotatably mounted in a bearing provided in the cover plate 11 and is adapted to receive the lower end of the wringer drive shaft 44, as shown in Figure 3. A cylindrical wall 47 is preferably provided on the cover 11 to enclose the connection between the wringer drive shaft and the socket 46, when the machine is assembled as shown in Figure 1. A crank arm 48 is secured to the lower end of the shaft 45 and is adapted to be engaged by the upper end of the crank pin 31 as particularly shown in Figure 3. The crank arm 48 is rotated by the crank pin 31 engaging the edge thereof as shown in Figure 2. By thus operating the crank arm 48 and, therefore, the socket 46, the wringer drive shaft may be relatively rotated in a forward direction with reference to the worm wheel 16.

From the foregoing, therefore, it will readily be seen that by the employment of this novel transmission in connection with a washing machine of the type here shown, that all strains generated in the transmission case by the operation of the mechanism, will be substantially taken up by the transmission case and will not be transmitted to the legs or frame of the machine. This will be understood as a result of the oscillatory shaft of the washing machine and also the wringer drive shaft being loosely connected to the driving mechanism, and as a result of the two shafts 34 and 45 operating the washing machine shaft and the wringer drive shaft, respectively, being mounted in the transmission case. The transmission case, as a whole, is also mounted and supported upon the supporting plate 14 upon which the operating motor 27 is mounted, thereby providing a power-driven transmission which may be assembled as a unit.

The construction of the transmission is very simple and inexpensive and all parts are so constructed that they are readily interchangeable. When the transmission is assembled the case 9 may be filled with a suitable lubricant thereby providing a mechanism which will be quiet and efficient in operation.

I claim as my invention:

1. In combination with a washing machine of the dolly type including a tub having supporting legs, a washer shaft, and a wringer shaft, and a casing arranged beneath the tub and supported at one end by a tub leg and at the opposite end by a platform supported by the tub legs, the casing having a wringer shaft rotating the washer shaft, oscillating mechanism including stub shafts having loose telescopic connection with respective shafts.

2. In combination with a washing machine of the dolly type including a tub and legs supporting the tub, a washer shaft, and a wringer shaft, and a shallow casing arranged beneath the tub, and supported at one end by a tub leg, and at the opposite end by a platform secured to the tub legs, the casing having therein a wringer shaft rotating the washer shaft oscillating mechanism, including stub shafts having loose telescopic connection respectively with the wringer and washer shafts.

3. A unit transmission device for a washing machine of the dolly type comprising an elongated casing having therein a crank gear journaled for rotation, said gear having a crank-pin on its upper side, a cover for the casing having a stub shaft telescopically engageable with a wringer-shaft of a machine of the dolly type, in a vertical direction, said shaft having a crank slidably engaging the upper portion of the crank-pin, a second stub shaft mounted in said casing and cover and telescopically engageable with a central washer-shaft of a machine of the type mentioned, and a transmission mechanism connecting the last mentioned shaft for oscillation when said first mentioned gear is rotated, including a rack pivoted to said crank-pin between said crank gear and crank arm.

4. A unit transmission device for a washing machine of the dolly type comprising an elongated casing having therein a crank gear journaled for rotation, said gear having a crank-pin on its upper side, a cover for the casing having a stub shaft telescopically engageable with a wringer-shaft of a machine of the dolly type, in a vertical direction, said shaft having a crank slidably engaging the upper portion of the crank-pin, a second stub shaft mounted in said casing and cover and telescopically engageable with a central washer-shaft of a machine of the type mentioned, and a transmission mechanism connecting the last mentioned shaft for oscillation when said first mentioned gear is rotated, including a rack pivoted to said crank-pin between said crank gear and crank arm and a drive worm meshing with said crank gear and having a shaft extending through the casing substantially parallel with its long axis and in a direction toward the opposite end of the casing.

5. In combination with a washing machine body having a central washer-shaft, and having three supporting legs related substantially as three corners of a rectangle, and further having a vertical wringer shaft positionally corresponding to a fourth leg in the remaining corner of the rectangle, a base carrying a casing on its upper side, said casing having driving means therein including stub shafts telescopically connected with respective first-mentioned shafts, said base connected at three corners to corresponding legs, and a short leg connected at the remaining corner of the base and acting as a support for the outermost end of the casing, and arranged in substantially vertical alinement with the wringer-shaft.

6. A unit transmission device for a washing machine of the dolly type, comprising a casing having therein a crank gear journaled for rotation, said gear having a pin, a cover for the casing having a stub shaft positioned to telescopically engage with the wringer, said shaft having a crank slidably engaging the crank pin to be released from the pin when the cover is removed, a second stub shaft mounted in the casing and cover and positioned to telescopically engage with the washer shaft, and transmission mechanism connecting the last mentioned shaft for oscillation when the first mentioned gear is rotated, including a rack pivoted to said crank pin between said gear and crank arm.

7. In combination with a washing machine including a tub, and washer and wringer shafts, supporting legs some of which are connected to the tub, a brace for the legs spaced downwardly from the tub, a casing arranged beneath the tub between the brace and the tub and partly supported by one of the legs, the upper end of which engages the casing, said casing containing wringer and washer shaft operating mechanism including shafts connected with respective first mentioned shafts, and said casing extending beneath the tub and washer shaft.

8. In combination with a washing machine including a tub and washer and wringer shafts, supporting legs for the tub, a casing arranged beneath the tub and partly supported by the leg, the said leg arranged substantially in alignment with the wringer shaft, and said casing containing wringer and washer shaft operating mechanism including a wringer shaft driving gear, the rotative axis of which is substantially aligned with the wringer shaft and leg, said casing extending inwardly and having means connecting its mechanism with the washer shaft, whereby the leg which supports the casing is placed substantially at the center of gravity of the machine when the wringer is swung from a position over the tub to one laterally thereof and substantially parallel with the long axis of the casing and radial to the vertical axis of the tub.

9. A unit transmission device comprising a casing having a crank gear journaled therein and having a crank pin, a cover for the casing having a shaft journaled therein, said shaft having a crank slidably engaging said pin, a second shaft carried by the casing, and transmission mechanism connecting those shafts and enclosed by the casing, and including a link swingable upon said crank pin between the crank gear and arm, said last mentioned shaft passing through the cover, in a manner to permit free removal of the cover.

10. In combination with a washing machine including a tub, and washer and wringer shafts journaled upon the tub, a casing arranged beneath the tub and containing shaft-driving mechanism, operably connected with the first mentioned shafts, the wringer shaft being journaled upon the tub at the outer side, and the washer shaft being journaled in the bottom of the tub, and legs supporting the tub, and also supporting the casing independently of the tub, including one leg which is attached beneath and directly to the casing in substantially vertical axial alignment with the wringer shaft, whereby the casing is leg-supported and not tub-supported.

11. In combination with a washing machine including a tub, and washer and wringer shafts journaled upon the tub, a casing arranged beneath the tub and containing shaft-driving mechanism, operably connected with the first mentioned shafts, the wringer shaft being journaled upon the tub at the outer side, and the washer shaft being journaled in the bottom of the tub, and legs supporting the tub, and also supporting the casing independently of the tub, including one leg which is attached beneath and directly to the casing in substantially vertical axial alignment with the wringer shaft, whereby the casing is leg-supported and not tub-supported, and means for driving said shaft driving mechanism which is also supported by the legs.

12. In combination with a washing machine including a tub and legs for u.. i h, a washer shaft passing through and journaled in the bottom of the tub, a wringer shaft arranged laterally of and supported upon the side of the tub, a casing arranged beneath the tub and having shaft driving mechanism operably connected with respective first mentioned shafts, one of the legs being attached beneath and directly to the casing in substantially vertical axial alignment with the wringer shaft, and means for additionally supporting the casing, said means being connected with the legs.

13. In combination with a washing machine including a tub, and washer and wringer shafts, both shafts being journaled upon the tub, a casing arranged beneath the tub and containing a reciprocatory mechanism including a driven crank gear having a crank pin, a gear rack connected with the crank pin and a pinion meshing with said rack and connected with said washer shaft, and also including shafts journaled in said casing and connected with respective first mentioned shafts.

14. In combination with a washing machine including a tub, and washer and wringer shafts journaled upon the tub, a casing arranged beneath the tub and containing reciprocatory mechanism including shafts journaled therein, and connected with respective first mentioned shafts to be detachably removed in a direction axially of said shafts, the wringer shaft being journaled at the outer side of the tub and the washer shaft at a point centrally of the tub, and legs supporting the tub including one which is attached beneath and directly to the casing in substantial vertical axial alignment with the wringer shaft.

In witness whereof, I have hereunto set my hand this 18th day of August, 1925.

HERMAN C. HIRSCHY.